United States Patent
Morgan

[11] 3,906,707
[45] Sept. 23, 1975

[54] HORSE TIE DOWN

[76] Inventor: Veldon Morgan, Ellsworth, Nebr. 69340

[22] Filed: Mar. 4, 1974

[21] Appl. No.: 448,067

[52] U.S. Cl. ............................ 54/35; 54/71; 119/29
[51] Int. Cl............................................. B68b 1/00
[58] Field of Search .................... 54/35, 71; 119/29

[56] References Cited
UNITED STATES PATENTS

| 69,106 | 9/1867 | Lindeman | 54/35 |
| 70,185 | 10/1867 | Fancher | 54/71 |
| 244,952 | 7/1881 | Turner | 54/71 |
| 434,421 | 8/1890 | Blaikie | 54/35 |
| 647,102 | 4/1900 | Marshall | 54/71 |
| 773,015 | 10/1904 | Kenny | 54/35 |
| 1,572,506 | 2/1926 | Renne | 54/71 X |

*Primary Examiner*—Louis G. Mancene
*Assistant Examiner*—J. Q. Lever
*Attorney, Agent, or Firm*—Clarence A. O'Brien; Harvey B. Jacobson

[57] ABSTRACT

A harness-type structure is provided for disposition over the bridle on a horse and includes an elongated flexible tether member for passage downward between the forelegs of the associated horse and attachment to the cinch of the saddle on the horse. The harness is provided to prevent the horse from excessively raising his head or throwing his head forward when being ridden. The tie down includes a first upstanding downwardly opening inverted U-shaped loop including opposite side legs and an upper bight portion for passage over the top of the head of the horse immediately behind his ears and a second rearwardly and downwardly inclined and downwardly opening inverted U-shaped loop for passage over the nose of the horse and corresponding legs of the two inverted U-shaped loops are secured together. The upper forward end of the aforementioned elongated tether member is anchored to the lower ends of all four legs of the loops. Also, a third rearwardly opening loop is provided and the free ends of its legs are attached to the upper ends of the legs of the forwardly and downwardly inclined loop with the bight portion of the third loop adapted to pass in front of the horse's head below his ears. The legs of the third loop additionally have flexible extensions which curve downwardly and then forwardly and upwardly and are anchored at their free ends to the opposite ends of the bight portion of the second rearwardly and downwardly inclined loop, the extensions serving to prevent the bight portion of the second rearwardly and downwardly inclined loop from dropping too low on the horse's nose.

9 Claims, 6 Drawing Figures

US Patent    Sept. 23, 1975    3,906,707
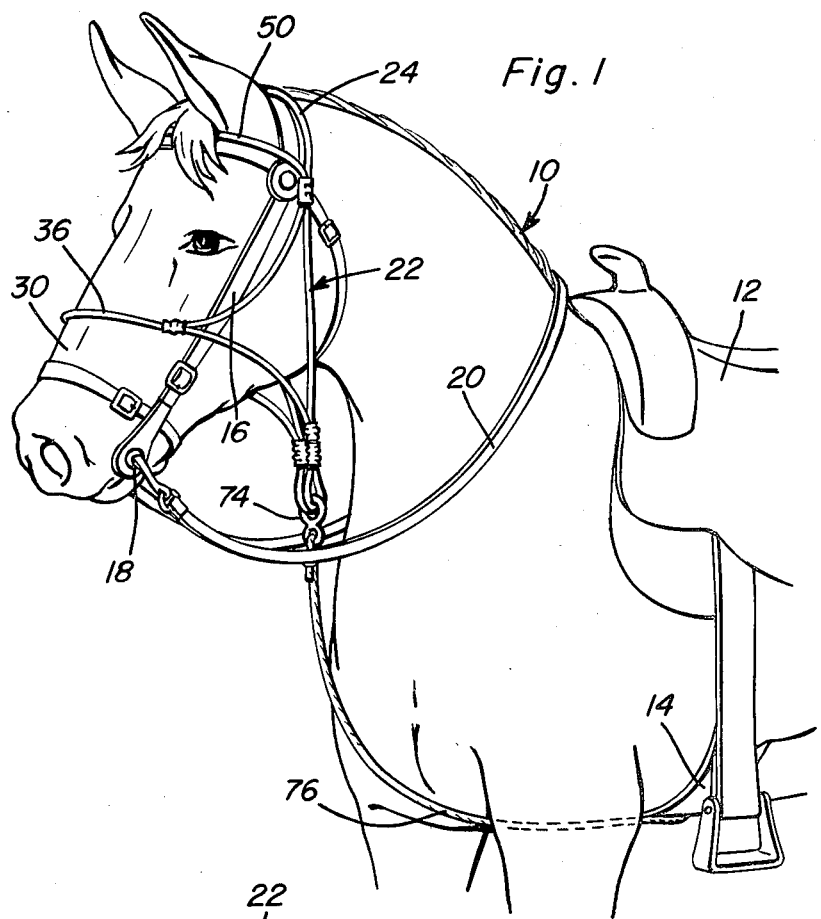
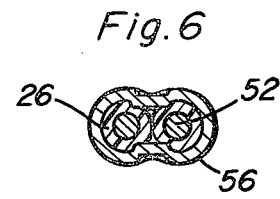
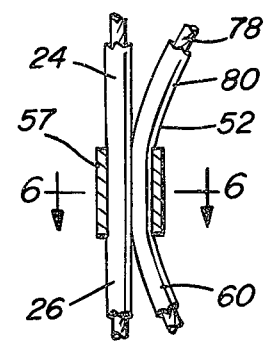
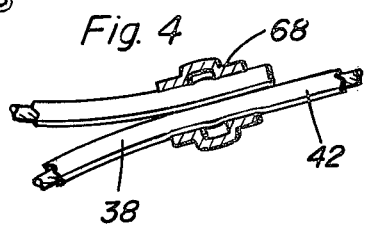
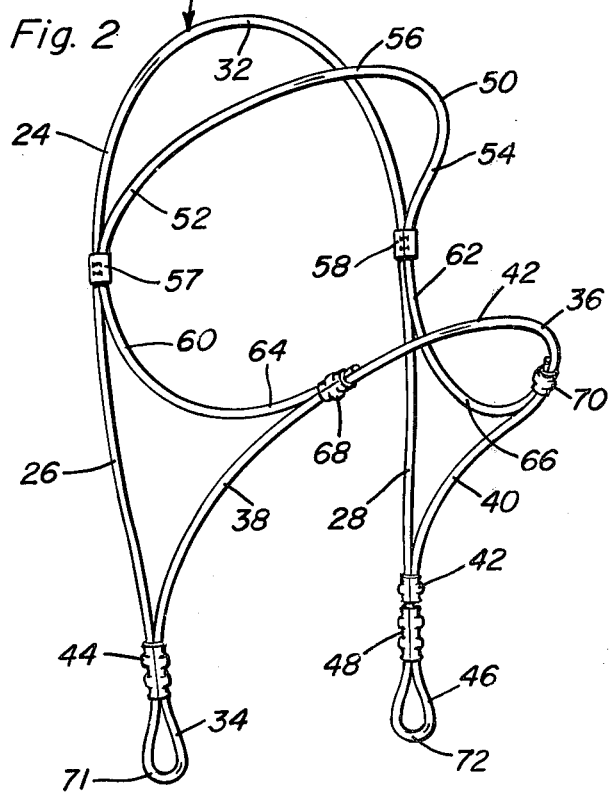
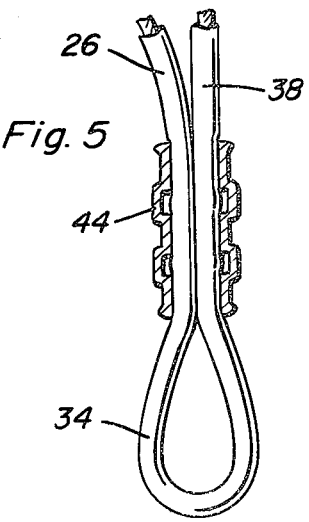

HORSE TIE DOWN

BACKGROUND OF THE INVENTION

Many fine horses are difficult to control when riding as a result of these horses having a tendency to excessively raise their head or throw their heads excessively forwardly. Although certain types of bridle bits have been designed to allow the rider to apply excessive pressure to sensitive areas of the horse's mouth should he attempt to raise his head excessively or throw his head excessively forward, these bits can cause irreparable damage to a horse's mouth and are very difficult to control as to the pressures exerted thereby inasmuch as the extent to which a horse elevates his head or throws his head forward varies the amount of pressure which may be applied by the rider of the horse through such a special bit. Accordingly, a need exists for a more humane way to control and thus prevent excessive upward movement of a horse's head or a horse throwing his head excessively forward.

BRIEF DESCRIPTION OF THE INVENTION

The hold down of the instant invention is provided to be worn by the horse over a conventional bridle and is constructed in a manner whereby the top of the horse's head as well as his nose are cradled by loops which may be anchored to the cinch of the saddle worn by the horse. In this manner, the upper head and nose loops define definite limits for controlling and thus preventing excessive upward swinging and forward swinging of the horse's head independent of the bridle worn by the horse.

The main object of this invention is to provide a hold down harness for a horse's head which will be effective, in conjunction with the cinch of the saddle worn by the horse, in limiting the amount a horse may elevate his head or throw his head forward.

Another object of this invention is to provide a harness in accordance with the immediately preceding object and which may be readily applied to a horse's head after a conventional bridle has been applied to the horse.

Still another object of this invention is to provide a hold down structure which may be readily constructed through the utilization of only two sections of flexible tension member and six readily applicable clamp members.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a horse both saddled and bridled and to which the hold down of the instant invention has been applied;

FIG. 2 is a perspective view of the harness portion of the hold down;

FIG. 3 is an enlarged fragmentary elevational view of the harness portion of the hold down and illustrating the manner in which adjacent portions thereof may be clamped together and with the clamp structure illustrated in vertical section;

FIG. 4 is a further enlarged fragmentary elevational view of still another portion of the harness illustrating a second form of clamp structure in vertical section and utilized to secure a second set of adjacent portions of the harness together;

FIG. 5 is an additional fragmentary elevational view illustrating a third form of clamp structure in vertical section securing adjacent portions of the harness together; and FIG. 6 is an enlarged horizontal sectional view taken substantially upon the plane indicated by the section line 6—6 of FIG. 3.

DETAILED DESCRIPTION OF THE INVENTION

Referring now more specifically to the drawings the numeral 10 generally designates a horse upon which a saddle 12 including a cinch 14 has been secured. In addition, a bridle 16 including a bit 18 and reins 20 is also illustrated as applied to the horse.

The hold down of the instant invention is referred to in general by the reference numeral 22 and includes a first large downwardly opening inverted U-shaped loop 24 consisting of a pair of opposite side legs 26 and 28 extending downwardly along opposite sides of the head 30 of the horse 10 and interconnected at their upper ends by means of an integral curved bight portion 32. The lower end of the leg 26 is bent back upwardly upon itself at at 34 and arranged to form a second rearwardly and downwardly inclined and downwardly opening inverted U-shaped loop 36 including opposite side legs 38 and 40 interconnected at their upper ends by means of an integral curved bight portion 42 extending over the nose of the horse 10. The lower end of the leg 40 is secured to the lower end portion of the leg 28 by means of a clamp 42 and the lower ends of the legs 26 and 38 are secured together by means of a second clamp 44. Further, the lower end of the leg 28 is bent back upwardly upon itself as at 46 and secured to the lower end of the leg 28 by means of a third clamp 48.

The harness comprising the hold down 22 further includes a third rearwardly opening loop 50 including opposite side legs 52 and 54 interconnected at their forward ends by means of a rearwardly opening curved bight portion 56. The rear ends of the legs 52 and 54 are secured to the upper ends of the legs 26 and 28 by means of fourth and fifth clamps 57 and 58 and include downward extensions 60 and 62 which curve upwardly and forwardly as at 64 and 66 and are secured to the upper ends of the legs 38 and 40 by means of sixth and seventh clamps 68 and 70.

The loops 71 and 72 defined by the backturned portions 34 and 46 are secured, as an anchor ring 74, to a tether 76 extending downwardly between the forelegs of the horse 10 and anchored at its rear end to the midportion of the cinch 14.

In operation, the loop 24, depending upon the attitude of the head 30 of the horse 10, is positioned with its legs 26 and 28 in a generally vertical position with the tether 76 being of sufficient length to allow the horse 10 to raise his head 30 a limited degree before the tether 76 and the loop 24 extending over the top of the horse's head are tensioned to prevent further upward movement of the head 30. In addition, forward swinging of the nose of the horse 10 is limited by the loop 36 until the tether 76 and loop 36 are tensioned to prevent further upward swinging of the hores's head.

The loops 24 and 36 are constructed of a single length of stiff but flexible and resilient cable 78 having a plastic sleeve-type covering 80. The loop 50 and the extensions 60 and 62 are formed of a similar material and it is to be readily understood that the harness or hold down 22 may be readily applied to the head 30 over the bridle 16. Further, other materials such as leather may be used to form the loops 24, 36 and 50, but the natural resiliency of the loop 50 and extensions 60 and 62, when constructed of plastic covered cable, tends to maintain the loops 24 and 36 properly spaced.

The foregoing is considered as illustrative only of the principles of the invention. Further, sinch numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hold down harness for the head of a horse when being ridden with a conventional cinch equipped saddle and a bridle, said harness comprising first elongated flexible tension member means arranged to form a first generally upright downwardly opening inverted U-shaped loop including opposite side legs interconnected by an upper bight portion and a second upstanding rearwardly and downwardly inclined and downwardly opening inverted U-shaped loop including opposite side legs interconnected by an upper bight portion, anchor means anchoring the lower ends of corresponding legs of said loops together, the bight portion of said first loop being elevated above the bight portion of the second loop, an elongated upstanding flexible tether member, said anchor means including means anchoring the ends of the legs of said loops to the upper end of said tether member, said tether member being adapted to pass downwardly and rearwardly between the front legs of a horse and including means on its lower end adapted to anchor said tether member to the mid-portion of said cinch, and second elongated flexible tension member means arranged to form a third rearwardly and downwardly opening loop including lower opposite side portions anchored to the upper end portion of the opposite side legs of said first loop.

2. The combination of claim 1 wherein said first tension member means comprises a single length of flexible cable having a resilient covering thereover.

3. The combination of claim 1 wherein the lower ends of the legs of said first loop are upwardly back-turned and at least one of said back-turned portions defines the lower end of the corresponding leg of the second loop.

4. The combination of claim 3 wherein said anchor means include a pair of clamps securing the upwardly back-turned portions to the lower end portions of the legs of said first loop.

5. The combination of claim 3 wherein said anchor means includes a third clamp securing the lower end portion of the other leg of the second loop to the lower end of the corresponding leg of the first loop.

6. The combination of claim 1 wherein the lower opposite side portions of said third loop curve downwardly along and generally parallel and are secured, by clamps, to the upper ends of the legs of the first loop, said lower opposite side portions including extensions below the clamps curving forwardly and upwardly and secured to the upper ends of the corresponding legs of said second loop.

7. The combination of claim 6 wherein said first tension member means comprises a single length of flexible cable having a resilient covering thereover 8. The combination of claim 7 wherein the lower ends of the legs of said first loop are upwardly back-turned and at least one of said back-turned portions defines the lower end of the corresponding leg of the second loop.

9. The combination of claim 8 wherein said anchor means includes a pair of clamps securing the upwardly back-turned portions to the lower end portions of the legs of said first loop.

* * * * *